United States Patent
Vu et al.

[11] Patent Number: 6,025,875
[45] Date of Patent: Feb. 15, 2000

[54] ANALOG SIGNAL SAMPLER FOR IMAGING SYSTEMS

[75] Inventors: Ha Vu; Kevin Elmer Brehmer, both of San Jose, Calif.

[73] Assignee: National Semiconductor Corporation, Santa Clara, Calif.

[21] Appl. No.: 08/652,814

[22] Filed: May 23, 1996

Related U.S. Application Data

[60] Provisional application No. 60/005,807, Oct. 23, 1995.

[51] Int. Cl.[7] .................................................. H04N 5/217
[52] U.S. Cl. ............................................ 348/241; 327/90
[58] Field of Search ................................. 327/90, 91, 94, 327/96; 257/296, 297, 298, 299, 300, 301; 348/207, 241, 243, 244, 248, 249, 250; 341/122; H04N 5/375

[56] References Cited

U.S. PATENT DOCUMENTS

| | | |
|---|---|---|
| 3,781,574 | 12/1973 | White et al. . |
| 4,287,441 | 9/1981 | Smith . |
| 5,329,312 | 7/1994 | Boisvert et al. . |
| 5,349,380 | 9/1994 | Stein ........................................ 348/250 |
| 5,475,427 | 12/1995 | Horowitz ................................ 348/241 |
| 5,717,457 | 2/1998 | Morimoto ............................... 348/241 |

OTHER PUBLICATIONS

Jaroslav Hynecek, "Theoretical Analysis and Optimization of CDS Signal Processing Method for CCD Image Sensors", IEEE Transactions of Electron Devices, vol. 39, No. 11, Nov. 1992, pp. 2497–2507.

Robert J. Kansy, "Response of a Correlated Double Sampling Circuit to 1/f Noise", IEEE Journal of Solid–State Circuits, vol. SC–15, Jun. 1980, pp. 373–375.

Masahiro Ohbo, Ikuo Akiyama, Takanori Tanaka, "A New Noise Suppression Method for High–Definition CCD Cameras", IEEE Transactions on Consumer Electronics, vol. 35, No. 3, Aug. 1989, pp. 368–374.

G.R. Hopkinson and D.H. Lumb, "Noise Reduction Techniques for CCD Image Sensors", Journal of Physics E. Scientific Instruments, vol. 15, No. 11, Nov. 1982, pp. 1214–1222.

Marvin H. White, Donald R. Lampe, Franklyn C. Blaha and Ingham A. Mack, "Characterization of Surface Channel CCD Image Arrays at Low Light Levels", IEEE Journal of Solid–State Circuits vol. SC–9, No. 1, Feb. 1974, pp. 1–13.

J.M. Pimbley and G. J. Michon, "The Output Power Spectrum Produced by Correlated Double Sampling", IEEE Transactions on Circuits and Systems, vol. 38, No. 9, Sep. 1991, pp. 1086–1090.

(List continued on next page.)

*Primary Examiner*—Tuan V. Ho
*Attorney, Agent, or Firm*—Limbach & Limbach LLP

[57] ABSTRACT

An analog signal sampler with improved correlated double sampling (CDS) performance for imaging systems includes a dual mode input amplifier, a switched capacitor network and a differential amplifier. The dual mode input amplifier has a high input impedance and allows for receiving either positive-going contact image sensor (CIS) or negative-going charge couple device (CCD) image signals as desired. The switched capacitor network and differential amplifier together perform an improved CDS of the image signal and convert the unipolar input image signal to a bipolar differential output signal with an improved dynamic signal range. The CDS technique used relies upon simultaneous charging of the coupling and sample and hold capacitances with charge transfer from the coupling capacitance to the sample and hold capacitance. The gain of the sampler can be programmed by appropriate selection of the ratio of the coupling capacitance to the sample and hold capacitance.

24 Claims, 6 Drawing Sheets

OTHER PUBLICATIONS

Anthony Rizzi, "N–Delta and Differential Average Signal Processors: Detailing of Their Signal and Noise Response", IEEE Journal of Solid–State Circuits, vol. 28, No. 1, Jan. 1993, pp. 49–58.

K.A. Parulski, L.J. D'Luna and R.H. Hibbard, "A Digital Color CCD Imaging System using Custom VLSI Circuits", IEEE Transactions on Consumer Electronics, vol. 35, No. 3, Aug. 1989, pp. 382–389.

Ryuji Nishimura, et al., "A RGB–$\gamma$ CCD Camera with a Novel Color Matrix", IEEE Transactions on Consumer Electronics, vol. 35, No. 3, Aug. 1989, pp.375–381.

Stephen H. Lewis, H. Scott Fetterman, George F. Gross, Jr., R. Ramachandran, T.R. Viswanathan, "A 10–b 20–Msample/s Analog–to–Digital Converter", IEEE Journal of Solid–State Circuits, vol. 27, No. 3, Mar. 1992, pp. 351–358.

ANALOG SIGNAL SAMPLER FOR IMAGING SYSTEMS

RELATED APPLICATIONS

This is a Continuation-In-Part of U.S. patent application Ser. No. 60/005,807, filed Oct. 23, 1995, and entitled "Imaging System Analog Signal Sampler."

BACKGROUND OF THE INVENTION

1. Field of the Invention

The present invention relates to analog signal samplers for imaging systems, and in particular, to analog signal samplers which use correlated double sampling (CDS) techniques for removing signal noise.

2. Description of the Related Art

Image sensors using charge couple devices (CCDs) are employed in many imaging applications such as scanners, digital cameras and video camcorders. As is well known in the art, CCD image sensors store analog signals as a series of discrete packets of charge. The charge stored at each cell of the CCD unit is proportional to the intensity of the light of an image incident on the area of that particular cell at a given point in time. The charge is transferred onto an output node once per sampling interval. Within each sampling interval, the previous charge at the output node is discharged to a circuit reference potential through a reset switch, thereby establishing a reference level at the output prior to each new charge transfer. Upon receiving a new charge, the output will charge to a new voltage level. A clock feedthrough appears at the output when the reset switch is turned off and the output settles to the reference level. However this reference level fluctuates due to the presence of noise having a mean square value given by kT/C. The existence of such noise limits the dynamic range of the analog image processing system. This problem is of particular concern in the more recently developed high resolution and high speed image sensors which must work with lower input charge and at much higher frequency.

One conventional technique for removing kT/C noise is that of correlated double sampling (CDS). This technique essentially measures the reference level of the output prior to the arrival of the new charge packet and subtracts this pre-charge level from the postcharge level. This method cancels the kT/C noise as well as suppresses low frequency noise.

Figure 1:
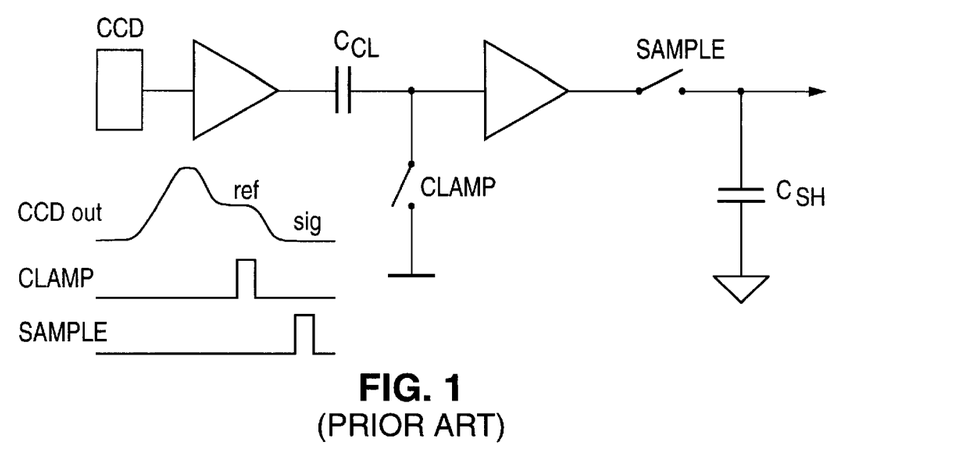
FIG. 1 illustrates a conventional correlated double sampling (CDS) circuit using a clamping technique.

Referring to FIG. 1, an early CDS circuit realization consists of an input buffer amplifier, a clamping circuit, a second buffer amplifier and a sample and hold stage. Following a reset pulse, when the CCD signal reaches the reference level, the clamp switch is closed briefly, thereby causing any reset noise to be stored on the coupling capacitor $C_{CL}$. Following the new charge transfer, when the CCD signal settles at the new signal level, the sample switch is closed, resulting in an output voltage (across the sample and hold capacitor $C_{SH}$) equal to the difference between the reference level and the new signal level of the CCD signal. Within one pixel, the reset noise is fully correlated between clamp and sample and is, therefore, virtually eliminated. The kT/C noise is more effectively removed if the coupling capacitor $C_{CL}$ is sufficiently large so that its own self-generated noise is small in comparison to the reference fluctuations on a much smaller capacitance of the floating diffusion node of the CCD.

Figure 2:
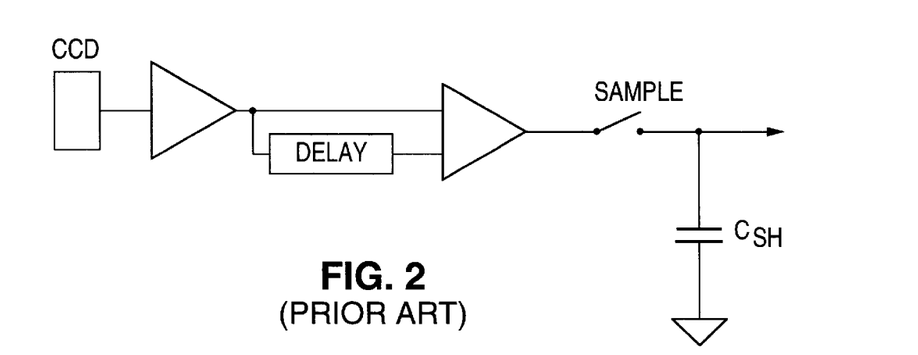
FIG. 2 illustrates a conventional CDS circuit using a delay line and differential amplifier.

Referring to FIG. 2, a circuit which eliminates the coupling capacitor $C_{CL}$ also eliminates the clamp switch. In this circuit, a delay line having delay dT, which is equivalent to the time difference between the clamp and sample pulse times in the circuit of FIG. 1, stores the reference level. A differential amplifier subtracts this stored reference level from the new signal level.

Figure 3:
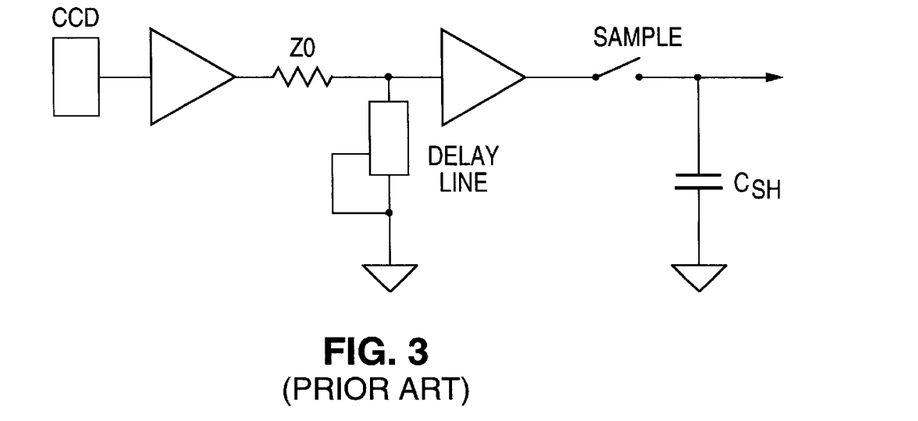
FIG. 3 illustrates a conventional CDS circuit using a delay line terminated by a short circuit.

Referring to FIG. 3, an alternative circuit replaces the delay line and the differential amplifier with a delay line terminated by a short circuit. In this circuit, the CCD output signal is supplied to the input terminal of the delay line through a resistance $Z_O$ which is the same as the characteristic impedance of the delay line. The reflected delayed signal from the delay line is mixed with the non-delayed signal at the input of the delay line. With a proper delay time, the output signal from the sample and hold is the difference between the signal and reference level of the CCD signal.

By eliminating the clamping pulses, those circuits which use the delay lines are theoretically useful for high frequency applications. However, practical implementations of this approach suffer from complications resulting from signal loss and propagation dispersion. Furthermore, the delay line can not be realized in an integrated circuit (IC).

Figure 4:
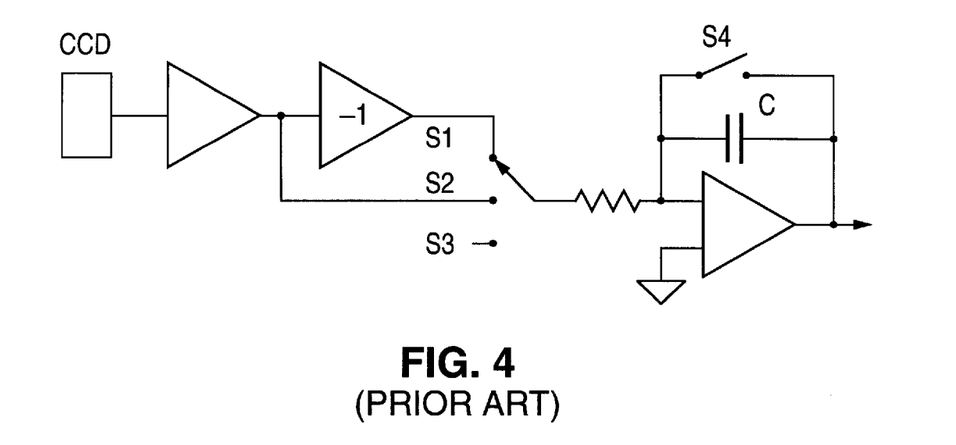
FIG. 4 illustrates a conventional CDS circuit using differential average technique.

Referring to FIG. 4, another circuit which uses a differential average, or dual slope technique, theoretically yields the best signal-to-noise ratio for kT/C noise. The circuit consists of a buffer amplifier, a switch, an inverting amplifier and an integrator. The integrator input is connected to the output of the buffer amplifier or the inverting amplifier, or left open, depending upon the position of the three-position switch. First, the integrator is reset by closing switch position S4. Then, switch position S4 is opened and switch position S1 is closed during the reference level interval of the CCD signal, thereby allowing the inverted reference level to be integrated onto the integrating capacitor C during time $t_S$. When the CCD signal changes to the image, or video, level, switch position S1 is opened and switch position S2 is closed, thereby connecting the integrator to the output of the buffer amplifier. The reference level plus the video level are integrated for the time $t_S$ when switch position S3 is opened. A signal equal to the difference between the reference level and video level is then held by the integrator. However, while this circuit has a better signal-to-noise ratio, it is less suitable for high speed applications due to the slow response of the integrator.

Since the CCD image sensor is generally the most expensive component in an imaging system, the lower cost contact image sensor (CIS) is seeing increasing use. The CIS consists of optical source, a rod lens array, photo sensors and electronic components housed in one unit. Unfortunately, the image signal produced by a CIS is different than the one produced by a CCD sensor. This presents a new challenge to the analog signal sampler which must work with both CIS and CCD sensors.

SUMMARY OF THE INVENTION

An analog signal sampler with improved correlated double sampling (CDS) performance for imaging systems in accordance with the present invention uses improved CDS techniques to remove thermal (KT/C) noise and offsets from analog image signals received from a charge coupled device (CCD) image sensor or contact image sensor (CIS). Such a signal sampler has a high input impedance and accepts unipolar signals from CCD and/or CIS sensors and maximizes the dynamic range by providing bipolar outputs in response to such signals with a programmable signal gain. Any internal offsets generated within the sampler are removed, or nulled out, by the topography of the sampler circuit itself.

An analog signal sampler with improved correlated double sampling (CDS) performance in accordance with one embodiment of the present invention includes two capacitive stages and a switching stage. The first capacitive stage is for selectively receiving an analog reference signal, a switched reference signal and an analog pixel signal and in accordance therewith charging to a first coupling charge state during a reference interval, providing a first plurality of transfer charges and charging to a second coupling charge state during an active interval. The analog pixel signal includes a reference value during the reference interval and an image value during the active interval. The second capacitive stage is for receiving the first plurality of transfer charges and the switched reference signal and in accordance therewith charging to a first sampling charge state during the reference interval, charging to a second sampling charge state during a first portion of the active interval, substantially maintaining the second sampling charge state during a second portion of the active interval and providing a first output signal which, in accordance with the second sampling charge state, corresponds to a first difference between the image and reference values of the analog pixel signal. The switching stage is coupled to and between the first and second capacitive stages and is for receiving the analog reference signal and a plurality of sampling control signals and in accordance therewith coupling the first and second capacitive stages during the reference interval and the first portion of the active interval, decoupling the first and second capacitive stages during the second portion of the active interval and providing the switched reference signal.

These and other features and advantages of the present invention will be understood upon consideration of the following detailed description of the invention and the accompanying drawings.

DETAILED DESCRIPTION OF THE INVENTION

An analog signal sampler with improved correlated double sampling (CDS) performance for imaging systems in accordance with the present invention uses improved CDS techniques to remove thermal (KT/C) noise and offsets from analog image signals received from a charge coupled device (CCD) image sensor or contact image sensor (CIS). Such a signal sampler has a high input impedance and accepts unipolar signals from CCD and/or CIS sensors and maximizes the dynamic range by providing bipolar outputs in response to such signals with a programmable signal gain. Any internal offsets generated within the sampler are removed, or nulled out, by the topography of the sampler circuit itself.

Figure 5:
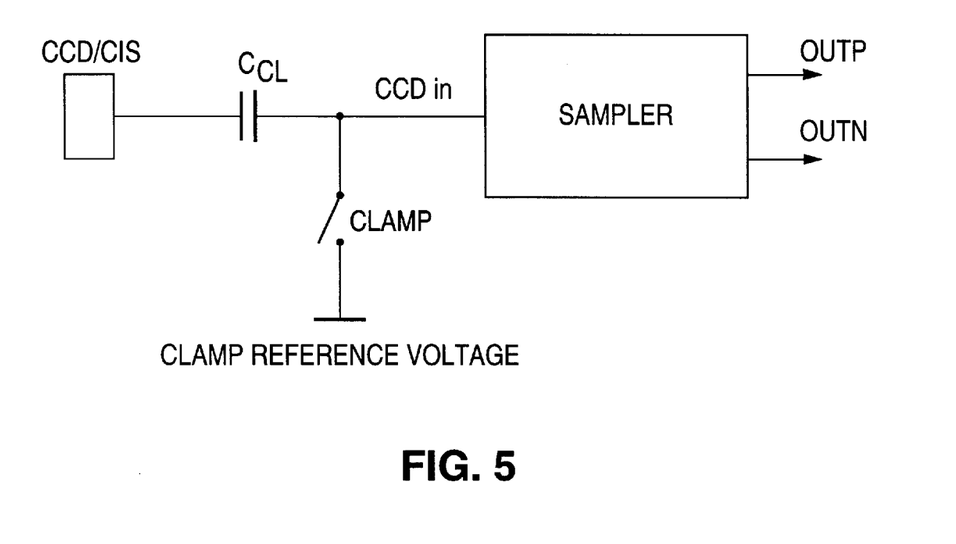
FIG. 5 illustrates an analog signal sampler connected to a CCD/CIS sensor though a dc restoration circuit.

Referring to FIG. 5, an analog signal sampler in accordance with the present invention is intended to be connected to the output of a CCD or CIS image sensor through a coupling capacitor $C_{CL}$. The coupling capacitor $C_{CL}$, in conjunction with a clamp switch, performs a DC restoration function and provides level shifting from a higher voltage (e.g. 12 volts) CCD or CIS image sensor to a lower voltage (e.g. 3–5 volts) image signal processing circuit.

During the reference pixel interval, the clamp switch is closed and the coupling capacitor $C_{CL}$ is charged up to a voltage having a value equal to the difference between the DC level of the image sensor signal and the clamp reference voltage. (The optimum clamp reference voltage is preferably equal in value to half of the supply voltage for the sampler circuit). Subsequently, during the active pixel interval, the clamp switch is opened. Provided that the input impedance of the sampler circuit is high, the coupling capacitor $C_{CL}$ holds its charge and acts as a DC level shifter for the image sensor signal, thereby shifting the DC level of the image sensor signal from its own DC level to a clamp reference level suitable for the sampler circuit.

Figure 6:
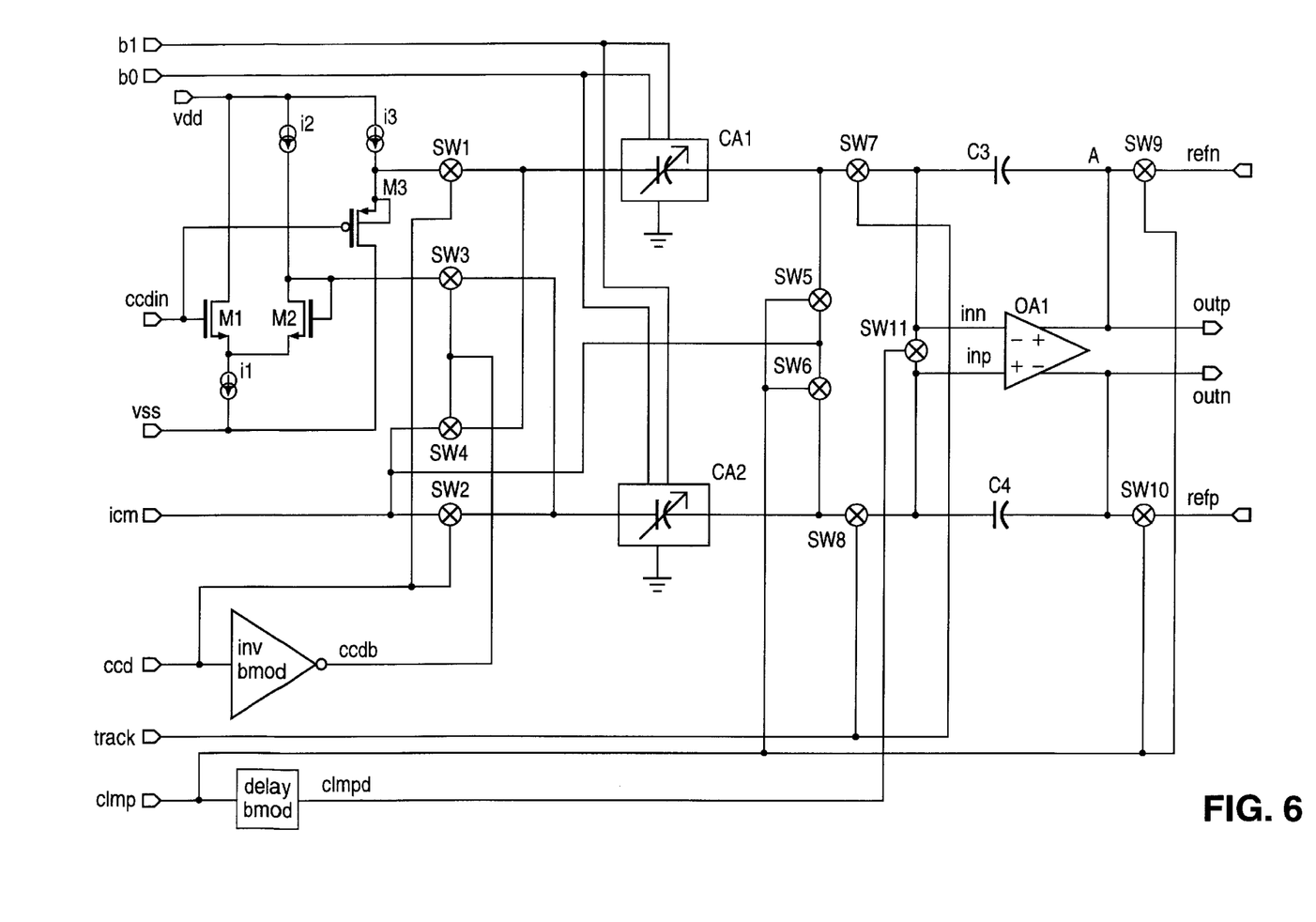
FIG. 6 illustrates an analog signal sampler in accordance with one embodiment of the present invention.

Referring to FIG. 6, an analog signal sampler with improved correlated double sampling (CDS) performance in accordance with one embodiment of the present invention includes an input buffer amplifier stage, an input switching network, a switched capacitor network, a reference and sampled signal switching network, and a differential integrator. As discussed in more detail below, these elements perform a number of functions: correlated double sampling of input signals; digitally programmable signal gain; conversion of single-ended input signals to differential output signals; and conversion of unipolar output signals to bipolar output signals.

The input analog image pixel signal CCDIN, from either a CIS or CCD sensor, is inputted to two unity gain amplifiers composed of N-type metal oxide semiconductor field effect transistors (MOSFETs) M1 and M2, P-type MOSFET M3, and current sources I1, I2 and I3. Transistor M3 is fabricated in an isolated N-well with the N-well substrate electrode connected to the source electrode of transistor M3. Hence, with a zero volt potential existing between the source and substrate, the threshold voltage $V_T$ of transistor M3 is not modulated by the input signal CCDIN driving its gate terminal. Therefore, the source-to-gate voltage $V_{GS}$ of transistor M3 is constant regardless of the variation in the input signal CCDIN voltage, and transistor M3 and current source I3 thereby function as a unity gain buffer amplifier.

Transistor M1 receives the input signal CCDIN at its gate terminal and operates as a source follower. Transistor M2 operates as a diode level shifter with the output signal provided at its interconnected gate and drain terminals. Transistors M1 and M2 are fabricated in a common P-type substrate and, since the P-type substrate is normally biased to the lowest power supply potential, will be subject to threshold voltage modulation due to changes in the input signal voltage. However, this interconnection of transistors M1 and M2 causes the threshold voltage of transistor M2 to track that of transistor M1. Therefore, the gate-to-source voltage of transistor M2 tracks the gate-to-source voltage of transistor M1, thereby causing the output signal voltage to equal that of the input. Current sources I1 and I2 provide biasing current sufficient to guarantee that I1 is greater than I2, thereby preventing current starving of transistor M2. Accordingly, transistors M1 and M2 and current sources I1 and I2 function together as a unity gain buffer amplifier.

As noted above, the input signal CCDIN is normally received by way of a DC restoration circuit which biases the input to a clamp reference voltage, which is typically half of the power supply voltage potential. Input transistors M1 and M3 provide high input impedances as required by such DC restoration circuit. Additionally, transistor M3 and current source I3, biased between positive and negative power supply potentials VDD and VSS, respectively, provide buffering for negative-going CCD image sensor signals, while transistors M1 and M2 and current sources I1 and I2, also biased between VDD and VSS, provide buffering for positive-going CIS image sensor signals.

The outputs of the buffer amplifiers, appearing at the source terminal of transistor M3 and drain terminal of transistor M2, are selectively switched by switches SW1 and SW3. An input reference voltage ICM (e.g., selected to be equal to the input common mode voltage of differential operational amplifier OA1, as discussed in more detail below) is selectively switched by switches SW2 and SW4. All of these switches SW1–SW4 are controlled by input control logic signal CCD and its inverse CCDB which indicate whether the incoming image signal CCDIN is from a CIS or CCD image sensor.

When the input image signal CCDIN is from a CCD image sensor, control logic signal CCD is at a logic high and switches SW1 and SW2 are closed while switches SW3 and SW4, driven by the inverse signal CCDB, are open. Hence, the output signal from transistor M3 is passed by switch SW1 to capacitor array CA1, while the input reference voltage ICM is passed by switch SW2 to capacitor array CA2.

When the input image signal CCDIN is from a CIS image sensor, logic signal CCD is at a logic low, thereby causing switches SW1 and SW2 to be open and switches SW3 and SW4, driven by the inverse signal CCDB, to be closed. Accordingly, the buffered input signal, appearing at the drain terminal of transistor M2, is passed by switch SW3 to capacitor array CA2, while the input reference voltage ICM is passed by switch SW4 to capacitor array CA1. (As should be understood from the following discussion, this switching action of switches SW1–SW4 causes positive-going image signals to be produced at the final output of the circuit, regardless of the polarity of the input signal CCDIN).

Capacitor arrays CA1 and CA2, in conjunction with operational amplifier (op-amp) OA1, integrating capacitors C3 and C4, and switches SW5–SW11, function together as a switched capacitor network stage and provide correlated double sampling, programmable signal gain and bipolar differential output signals. Op-amp OA1 is preferably constructed of MOSFETs so as to provide very high input and output impedances and limited output current sinking and sourcing.

This switched capacitor network stage is controlled by three control logic signals: TRACK, CLAMP and CLAMPD. The CLAMPD signal is a time-delayed version of signal CLAMP. Reference voltages REFN and REFP, selectively applied to output terminals OUTP and OUTN of op-amp OA1 via switches SW9 and SW10, respectively, are high and low reference voltages, respectively, which cover the output voltage range of op-amp OA1.

Figure 7:
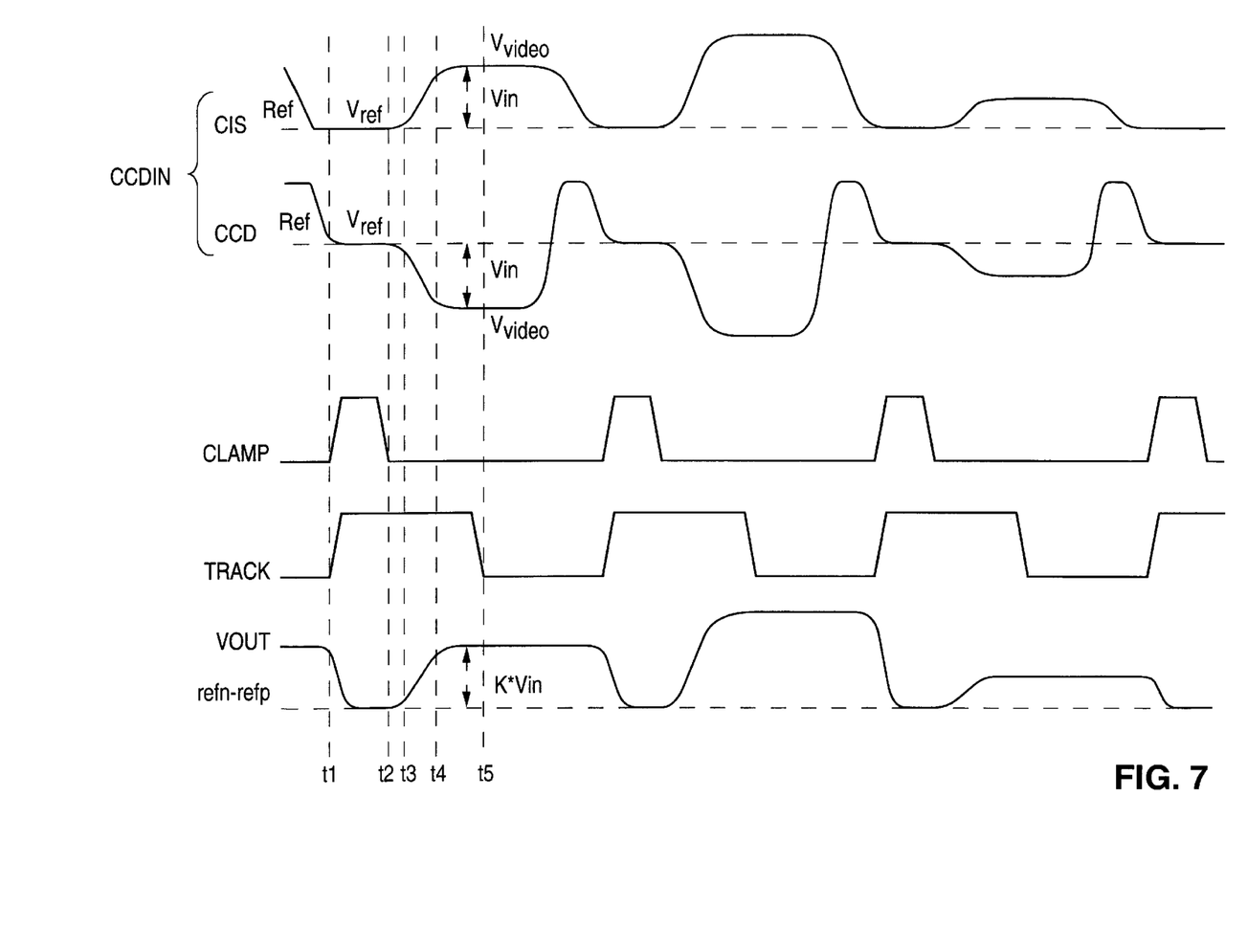
FIG. 7 is a signal timing diagram for the circuit of FIG. 6.

Referring to FIGS. 6 and 7 together, operation of the switched capacitor network stage can be better understood.

At time T1, when input image signal CCDIN, whether from a CIS or CCD image sensor, reaches the reference level $V_{REF}$, both input logic signals TRACK and CLAMP are set at logic high levels. Accordingly, switches SW5–SW11 are closed. If operating in the CCD mode, input signal CCDIN is from a CCD image sensor and logic signal CCD is high and capacitor array CA1 charges to a voltage value equal to the difference between the image signal reference voltage $V_{REF}$ and the input reference voltage ICM. Meanwhile, capacitor array CA2 has zero volts across it due to the application of the input reference voltage ICM on both of its terminals via switches SW2 and SW6. Capacitor C3 charges up to a voltage value equal to the difference between output reference voltage REFN (applied via switch SW9) and the input reference voltage ICM (applied via switches SW5 and SW7). Capacitor C4 charges to a voltage value equal to a difference between output reference voltage REFP (applied via switch SW10) and input reference voltage ICM (applied via switches SW6 and SW8).

At time T2, logic signal CLAMP is reset to a logic low level, thereby causing switches SW5, SW6, SW9 and SW10 to open. (Charge injection to the inverting and non-inverting terminals of op-amp OA1 from switches SW5 and SW6 turning off may cause an offset but not distortion since switches SW5 and SW6 are switching the same voltage signal off, i.e. input reference voltage ICM. If the symmetrically corresponding components of this differential circuit are perfectly matched, any such offset will be cancelled at the output. In practice, however, such components are not perfectly matched, but switch SW11 helps to minimize any such offset). A short time delay thereafter, delayed logic signal CLAMPD is also reset to a logic low, thereby causing switch SW11 to open. (Provided that the time constant based upon the on-resistance of switch SW11 and the capacitances of capacitors C3 and C4 is small compared to the time delay of signal CLAMPD, switch SW11 will balance out any charge injection from both switches SW5 and SW6, thereby minimizing any offset due to charge injection).

If the electrical charges being held by the capacitances at the non-inverting and inverting input terminals of op-amp OA1 are designated as $q1^+$ and $q1^-$, respectively, it can be shown that:

$$q1^+ = (v_{icm} - v_{ref})*kC + (v_{icm} - v_{refn})*C \quad (1)$$

$$q1^- = (v_{icm} - v_{refp})*C \quad (2)$$

where:
  kC=capacitance value of capacitor array CA1 and CA2
  C=capacitance value of capacitors C3 and C4.

At time T3, the input image signal CCDIN begins changing from its reference level $V_{REF}$ to a value $V_{VIDEO}$ representing the new image pixel value. Accordingly, capacitor array CA1 begins acquiring new charge and the amount of such new charge transfers from capacitor array CA1 to capacitor C3. This, in turn, causes the output voltage $V_{OUTP}$ at terminal OUTP of op-amp OA1 to start changing. The common mode feedback present within the op-amp OA1 senses this change and internally drives the op-amp OA1 in such a manner as to maintain the common mode output. Hence, the inverting output voltage $V_{OUTN}$ at terminal OUTN of op-amp OA1 also starts changing. At time T4, the image signals reaches its new pixel value $V_{VIDEO}$. At time T5, both outputs OUTP, OUTN of op-amp OA1 settle to their final values and logic signal TRACK is reset to a logic low, thereby causing switches SW7 and SW8 to open and the op-amp OA1 outputs OUTP, OUTN to hold their final values.

When switches SW7 and SW8 turn off (open), charges from them are injected into the inverting and non-inverting terminals, respectively, of op-amp OA1. These charges, which vary in accordance with the input signal, will cause distortion in the output signal(s) if they are not cancelled out. Such distortion can be minimized, however, by ensuring that the symmetrically corresponding components in this differential circuit are closely matched.

At this point in time, it can be shown that the electrical charges $q2^+$ and $q2^-$ held at non-inverting and inverting input terminals, respectively, of op-amp OA1 are as follows:

$$q2^+ = (v_{inn} - v_{video})*kC + (v_{inn} - v_{outp})*C \quad (3)$$

$$q2^- = (v_{inp} - v_{icm})*kC + (v_{inp} - v_{outn})*C \quad (4)$$

where:

$V_{INN}$=input voltage at inverting terminal of op-amp OA1

$V_{INP}$=input voltage at non-inverting terminal of op-amp OA1.

Due to charge conservation, it can be shown that:

$$q1^+ = q2^+ \quad (5)$$

$$q1^- = q2^- \quad (6)$$

Assuming op-amp OA1 has a negligible input offset, it can be further shown that:

$$v_{inp} = v_{inn} \quad (7)$$

Solving Equations (1) through (7), it can be shown that:

$$v_{outp} - v_{outn} = -k*(v_{video} - v_{ref}) + (v_{refn} - v_{refp}) \quad (8)$$

As can be seen from Equation (8), correlated double sampling is performed by the switched capacitor network by sampling the difference between the input signal reference $V_{REF}$ and pixel $V_{VIDEO}$ voltage levels for each pixel and providing a differential output $V_{OUTP} - V_{OUTN}$. Additionally, the outputs are converted from unipolar to bipolar in accordance with a DC level shift equal to $V_{REFN} - V_{REFP}$. The signal gain k provided is the ratio of the value of capacitor array CA1 (or CA2) to that of integrating capacitor C3 (or C4). Hence, the signal gain k is programmable in accordance with the value of capacitor arrays CA1 and CA2.

Equation (7) above assumes that the input offset for op-amp OA1 is negligible. However, if the input offset voltage $V_{OFFSET}$ of op-amp OA1 is included (i.e. $v_{inp} = v_{inn} + v_{offset}$), it can be shown that:

$$v_{outp} - v_{outn} = -k*(v_{video} - v_{ref}) + (v_{refn} - v_{refp}) + (k+1)*v_{offset} \quad (9)$$

As shown in Equation (9), the output offset, $(k+1)*V_{OFFSET}$, changes with signal gain. This will create output distortion if the gain changes at the pixel rate.

Figure 8:
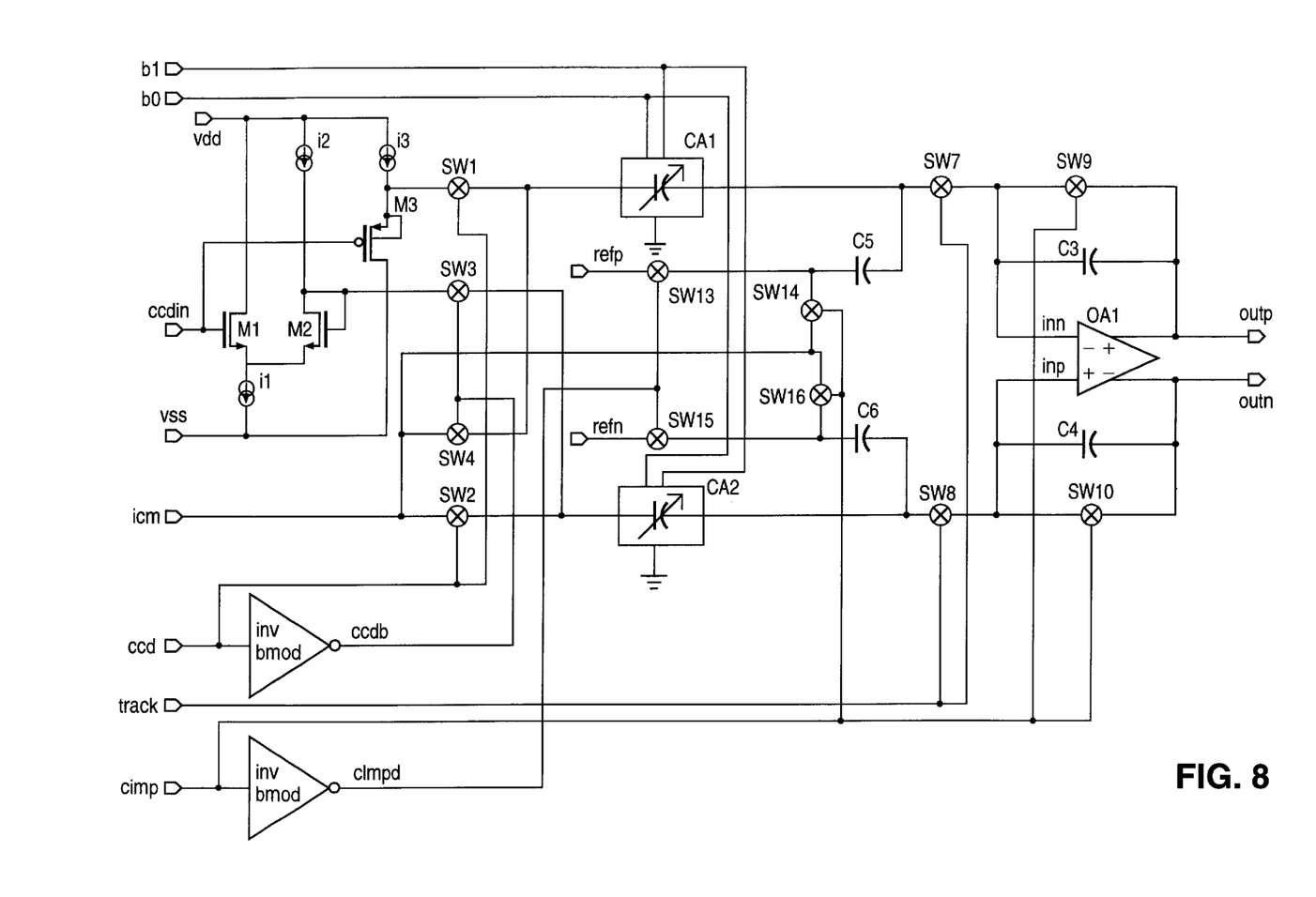
FIG. 8 illustrates an analog signal sampler in accordance with another embodiment of the present invention.

Referring to FIG. 8, an alternative signal sampler includes a input buffer amplifier stage, input switching stage and capacitor arrays, as discussed above for the circuit of FIG. 6, but uses a different configuration of switches between the capacitor arrays CA1, CA2 and op-amp OA1. For example, switches SW9 and SW10 are connected in parallel with integrating capacitors C3 and C4 instead of connecting between op-amp OA1 outputs OUTP and OUTN and reference voltages REFN and REFP, respectively. Also, switches SW5, SW6 and SW11 are eliminated. Four additional switches SW13–SW16 and two additional capacitors C5, C6 are included. Capacitors C5 and C6 have capacitance values equal to those of capacitors C3 and C4. The control timing of this circuit is similar to that for the circuit shown in FIG. 6, and it can be shown that:

$$q1^+ = (v_{inn} - v_{ref})*kC + (v_{inn} - v_{icm})*C \quad (10)$$

$$q1^- = (v_{inp} - v_{icm})*kC + (v_{inp} - v_{icm})*C \quad (11)$$

$$q2^+ = (v_{inn} - v_{video})*kC + (v_{inn} - v_{refp})*C + (v_{inn} - v_{outp})*C \quad (12)$$

$$q2^- = (v_{inp} - v_{icm})*kC + (v_{inp} - v_{refn})*C + (v_{inp} - v_{outn})*C \quad (13)$$

$$v_{outp} - v_{outn} = -k*(v_{video} - v_{ref}) + (v_{refn} - v_{refp}) - V_{offset} \quad (14)$$

As shown in Equation (10), the output offset voltage for this circuit does not vary with signal gain. Hence, the offset will not create distortion in applications where the gain is switching at a pixel rate. However, one requirement for this circuit is that the input and output common mode operations of the op-amp OA1 must be the same.

Figure 9:
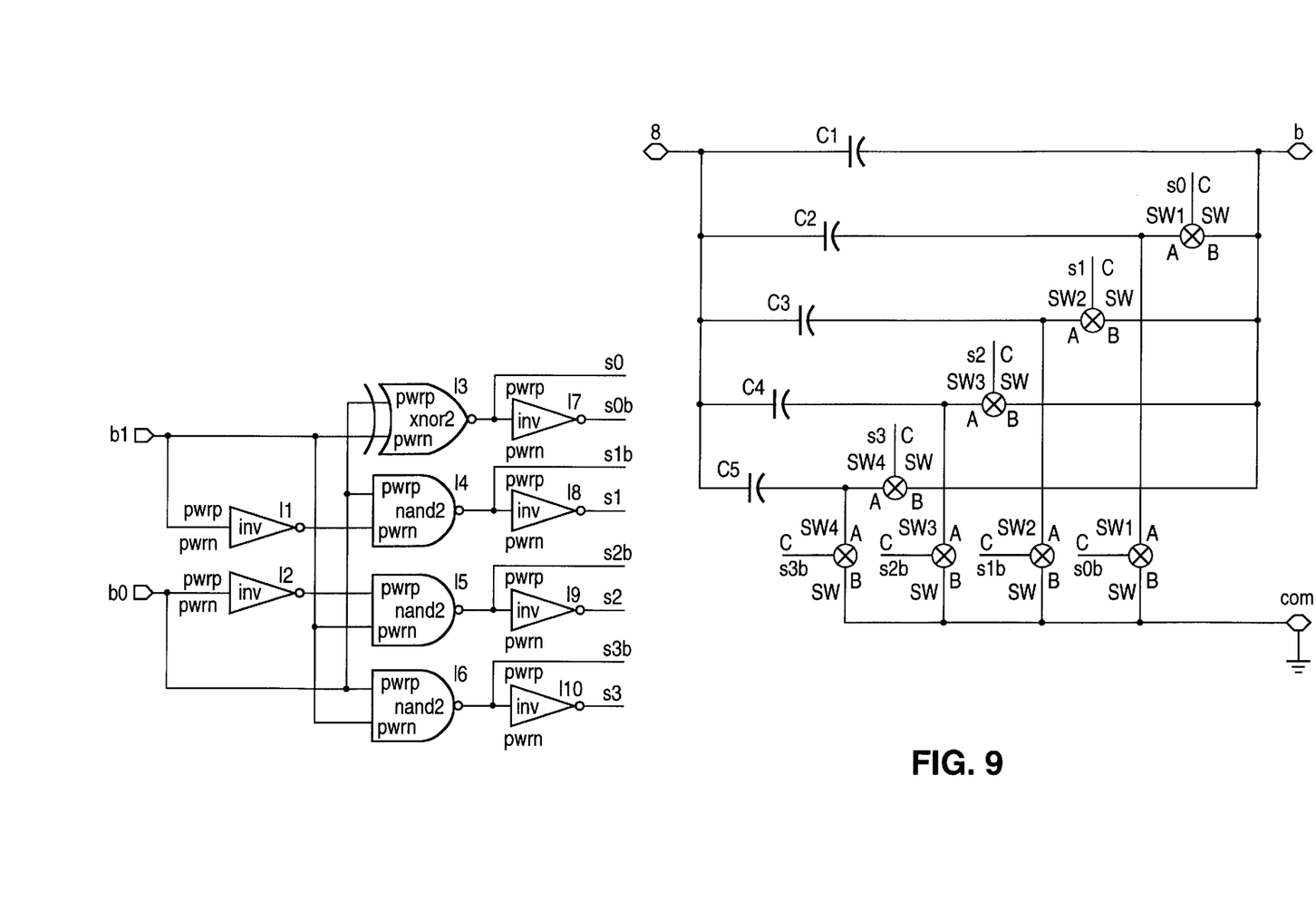
FIG. 9 illustrates a capacitor array for use in the circuits of FIGS. 7 and 8 to provide a programmable gain.

Referring to FIG. 9, a capacitor array suitable for use as capacitor arrays CA1 and CA2 includes an array of capacitors C1–C5 which are selectively interconnected by switches SW1–SW4 which, in turn, are controlled by logic gates I1–I10. Two binary input control signals B0 and B1 are decoded by the logic gates I1–I10 to generate four control signals S0–S3 and their complementary control signals S0B–S3B. Any logic high level of control signals S0–S3 will connect its corresponding capacitor (C2–C5) in parallel with primary capacitor C1. Hence, the value of this capacitor array, and thus the signal gain, as discussed above, is determined by the two logic control signals B0 and B1.

The above-discussed signal switches SW1–SW16 are preferably constructed as transmission gates by connecting N-type and P-type MOSFETs in parallel with interconnected drain terminals and interconnected source terminals. One of the device gate terminals is connected to the input control logic signal, while the gate terminal of the other device is connected to the logical inverse of such signal. For purposes of simplicity, the above-discussed switches have been discussed and shown as receiving one input control logic signal. However, it should be understood that such signal can be considered as representing the application of both the control logic signal and its inverse, or alternatively, it should be understood that inversion of the input logic signal is accomplished within the switch assembly itself.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an analog signal sampler with improved correlated double sampling (CDS) performance for imaging systems, said analog signal sampler comprising:

a first capacitive stage for selectively receiving an analog reference signal, a switched reference signal and an analog pixel signal and in accordance therewith charging to a first coupling charge state during a reference interval, providing a first plurality of transfer charges and charging to a second coupling charge state during an active interval, wherein said analog pixel signal includes a reference value during said reference interval and an image value during said active interval;

a second capacitive stage for receiving said first plurality of transfer charges and said switched reference signal and in accordance therewith charging to a first sampling charge state during said reference interval, charging to a second sampling charge state during a first portion of said active interval, substantially maintaining said second sampling charge state during a second portion of said active interval and providing a first output signal which, in accordance with said second sampling charge state, corresponds to a first difference between said image and reference values of said analog pixel signal; and a switching stage, coupled to and between said first and second capacitive stages, for receiving said analog reference signal and a plurality of sampling control signals and in accordance therewith coupling said first and second capacitive stages during said reference interval and said first portion of said active interval, decoupling said first and second capacitive stages during said second portion of said active interval and providing said switched reference signal.

2. The apparatus of claim 1, wherein said first capacitive stage comprises a capacitor with a first plate terminal for selectively receiving said analog reference signal and said analog pixel signal, and a second plate terminal for receiving said switched reference signal and providing said first plurality of transfer charges.

3. The apparatus of claim 1, wherein said second capacitive stage comprises a capacitor with a first plate terminal for receiving said first plurality of transfer charges and said switched reference signal, and a second plate terminal for providing said first output signal.

4. The apparatus of claim 1, wherein said switching stage comprises a plurality of switches for receiving said analog reference signal and a first one of said plurality of sampling control signals and in accordance therewith providing said switched reference signal and for receiving a second one of said plurality of sampling control signals and in accordance therewith coupling said first and second capacitive stages during said reference interval and said first portion of said active interval and decoupling said first and second capacitive stages during said second portion of said active interval.

5. The apparatus of claim 1, wherein said first and second capacitive stages include first and second capacitors with first and second capacitances, respectively, and said correspondence of said first output signal to said first difference between said image and reference values of said analog pixel signal is a proportionality equal to a ratio of said first capacitance to said second capacitance.

6. The apparatus of claim 1, wherein said analog signal sampler further comprises:

a third capacitive stage for selectively receiving said analog reference signal, said switched reference signal and said analog pixel signal and in accordance therewith charging to a third coupling charge state during said reference interval, providing a second plurality of transfer charges and charging to a fourth coupling charge state during said active interval; and a fourth capacitive stage for receiving said second plurality of transfer charges and said switched reference signal and in accordance therewith charging to a third sampling charge state during said reference interval, charging to a fourth sampling charge state during said first portion of said active interval, substantially maintaining said fourth sampling charge state during said second portion of said active interval and providing a second output signal which, in accordance with said fourth sampling charge state, corresponds to a second difference between said image and reference values of said analog pixel signal;

wherein said switching stage is further coupled to and between said third and fourth capacitive stages and, in accordance with said analog reference signal and said plurality of sampling control signals, is for coupling said third and fourth capacitive stages during said reference interval and said first portion of said active interval and decoupling said third and fourth capacitive stages during said second portion of said active interval.

7. The apparatus of claim 6, wherein said first and second output signals together comprise a differential output signal which, in accordance with said second and fourth sampling charge states, is proportional to a third difference between said image and reference values of said analog pixel signal.

8. The apparatus of claim 7, wherein said first and third capacitive stages include first and third capacitors each with a first capacitance, said second and fourth capacitive stages include second and fourth capacitors each with a second capacitance, and said proportionality of said differential output signal to said third difference between said image and reference values of said analog pixel signal is equal to a ratio of said first capacitance to said second capacitance.

9. The apparatus of claim 6, wherein:

said first and third capacitive stages together comprise a first differential capacitive network for receiving said analog reference signal, said switched reference signal and said analog pixel signal and in accordance therewith charging to said first and third coupling charge states during said reference interval, providing said first and second pluralities of transfer charges as a differential plurality of transfer charges and charging to said second and fourth coupling charge states during said active interval; and said second and fourth capacitive stages together comprise a second differential capacitive network for receiving said differential plurality of transfer charges and said switched reference signal and in accordance therewith charging to said first and third sampling charge states during said reference interval, charging to said second and fourth sampling charge states during said first portion of said active interval, substantially maintaining said second and fourth sampling charge states during said second portion of said active interval and providing said first and second output signals as a differential output signal which, in accordance with said second and fourth sampling charge states, is proportional to a third difference between said image and reference values of said analog pixel signal.

10. The apparatus of claim 9, wherein said first and third capacitive stages include first and third capacitors each with a first capacitance, said second and fourth capacitive stages include second and fourth capacitors each with a second capacitance, and said proportionality of said differential output signal to said third difference between said image and reference values of said analog pixel signal is equal to a ratio of said first capacitance to said second capacitance.

11. The apparatus of claim 9, wherein said switching stage comprises a plurality of switches for receiving said analog reference signal and a first one of said plurality of sampling control signals and in accordance therewith providing said switched reference signal and for receiving a second one of said plurality of sampling control signals and in accordance therewith coupling said first and second capacitive stages during said reference interval and said first portion of said active interval, coupling said third and fourth capacitive stages during said reference interval and said first portion of said active interval, decoupling said first and second capacitive stages during said second portion of said active interval, and decoupling said third and fourth capacitive stages during said second portion of said active interval.

12. The apparatus of claim 1, wherein said analog signal sampler is further for imaging systems using either a charge couple device (CCD) or contact image sensor (CIS) and further comprises:

a CCD signal amplifier for receiving an analog CCD signal and in response thereto providing an amplified CCD signal;

a CIS signal amplifier for receiving an analog CIS signal and in response thereto providing an amplified CIS signal; and a signal selector, coupled to said CCD and CIS signal amplifiers, for receiving one of said plurality of sampling control signals, said analog reference signal, said amplified CCD signal and said amplified CIS signal and in accordance therewith providing said analog reference signal and one of said amplified CCD and CIS signals as said analog pixel signal.

13. A method of providing an apparatus including an analog signal sampler with improved correlated double sampling (CDS) performance for imaging systems, said method comprising the steps of:

providing a first capacitive stage for performing the step of selectively receiving an analog reference signal, a switched reference signal and an analog pixel signal and in accordance therewith charging to a first coupling charge state during a reference interval, outputting a first plurality of transfer charges and charging to a second coupling charge state during an active interval, wherein said analog pixel signal includes a reference value during said reference interval and an image value during said active interval;

providing a second capacitive stage for performing the step of receiving said first plurality of transfer charges and said switched reference signal and in accordance therewith charging to a first sampling charge state during said reference interval, charging to a second sampling charge state during a first portion of said active interval, substantially maintaining said second sampling charge state during a second portion of said active interval and outputting a first output signal which, in accordance with said second sampling charge state, corresponds to a first difference between said image and reference values of said analog pixel signal; and providing a switching stage, coupled to and between said first and second capacitive stages, for performing the step of receiving said analog reference signal and a plurality of sampling control signals and in accordance therewith coupling said first and second capacitive stages during said reference interval and said first portion of said active interval, decoupling said first and second capacitive stages during said second portion of said active interval and outputting said switched reference signal.

14. The method of claim 13, wherein said step of providing a first capacitive stage comprises providing a capacitor with a first plate terminal for performing the step of selectively receiving said analog reference signal and said analog pixel signal, and providing a second plate terminal for performing the step of receiving said switched reference signal and outputting said first plurality of transfer charges.

15. The method of claim 13, wherein said step of providing a second capacitive stage comprises providing a capacitor which includes a first plate terminal for performing the step of receiving said first plurality of transfer charges and said switched reference signal, and includes a second plate terminal for performing the step of outputting said first output signal.

16. The method of claim 13, wherein said step of providing a switching stage comprises providing a plurality of switches for performing the step of receiving said analog reference signal and a first one of said plurality of sampling control signals and in accordance therewith outputting said switched reference signal and for performing the step of receiving a second one of said plurality of sampling control signals and in accordance therewith coupling said first and second capacitive stages during said reference interval and said first portion of said active interval and decoupling said first and second capacitive stages during said second portion of said active interval.

17. The method of claim 13, wherein said steps of providing first and second capacitive stages include providing first and second capacitors with first and second capacitances, respectively, and said correspondence of said first output signal to said first difference between said image and reference values of said analog pixel signal is a proportionality equal to a ratio of said first capacitance to said second capacitance.

18. The method of claim 13, wherein said method of providing an apparatus including an analog signal sampler with improved correlated double sampling (CDS) performance for imaging systems further comprises:

providing a third capacitive stage for performing the step of selectively receiving said analog reference signal, said switched reference signal and said analog pixel signal and in accordance therewith charging to a third coupling charge state during said reference interval, outputting a second plurality of transfer charges and charging to a fourth coupling charge state during said active interval; and providing a fourth capacitive stage for performing the step of receiving said second plurality of transfer charges and said switched reference signal and in accordance therewith charging to a third sampling charge state during said reference interval, charging to a fourth sampling charge state during said first portion of said active interval, substantially maintaining said fourth sampling charge state during said second portion of said active interval and outputting a second output signal which, in accordance with said fourth sampling charge state, corresponds to a second difference between said image and reference values of said analog pixel signal;

wherein said switching stage is further coupled to and between said third and fourth capacitive stages and, in accordance with said analog reference signal and said plurality of sampling control signals, is for performing the step of coupling said third and fourth capacitive stages during said reference interval and said first portion of said active interval and decoupling said third and fourth capacitive stages during said second portion of said active interval.

19. The method of claim 18, wherein said first and second output signals together comprise a differential output signal which, in accordance with said second and fourth sampling charge states, is proportional to a third difference between said image and reference values of said analog pixel signal.

20. The method of claim 19, wherein said steps of providing first and third capacitive stages include providing first and third capacitors each with a first capacitance, said steps of providing second and fourth capacitive stages include providing second and fourth capacitors each with a second capacitance, and said proportionality of said differential output signal to said third difference between said image and reference values of said analog pixel signal is equal to a ratio of said first capacitance to said second capacitance.

21. The method of claim 18, wherein:

said steps of providing first and third capacitive stages together comprise the step of providing a first differential capacitive network for performing the step of receiving said analog reference signal, said switched reference signal and said analog pixel signal and in accordance therewith charging to said first and third coupling charge states during said reference interval, outputting said first and second pluralities of transfer charges as a differential plurality of transfer charges and charging to said second and fourth coupling charge states during said active interval; and said steps of providing second and fourth capacitive stages together comprise the step of providing a second differential capacitive network for performing the step of receiving said differential plurality of transfer charges and said switched reference signal and in accordance therewith charging to said first and third sampling charge states during said reference interval, charging to said second and fourth sampling charge states during said first portion of said active interval, substantially maintaining said second and fourth sampling charge states during said second portion of said active interval and outputting said first and second output signals as a differential output signal which, in accordance with said second and fourth sampling charge states, is proportional to a third difference between said image and reference values of said analog pixel signal.

22. The method of claim 21, wherein said steps of providing first and third capacitive stages include providing first and third capacitors each with a first capacitance, said steps of providing second and fourth capacitive stages include providing second and fourth capacitors each with a second capacitance, and said proportionality of said differential output signal to said third difference between said image and reference values of said analog pixel signal is equal to a ratio of said first capacitance to said second capacitance.

23. The method of claim 21, wherein said step of providing a switching stage comprises providing a plurality of switches for performing the step of receiving said analog reference signal and a first one of said plurality of sampling control signals and in accordance therewith outputting said switched reference signal and for performing the step of receiving a second one of said plurality of sampling control signals and in accordance therewith coupling said first and second capacitive stages during said reference interval and said first portion of said active interval, coupling said third and fourth capacitive stages during said reference interval and said first portion of said active interval, decoupling said first and second capacitive stages during said second portion of said active interval, and decoupling said third and fourth capacitive stages during said second portion of said active interval.

24. The method of claim 13, wherein said analog signal sampler is further for imaging systems using either a charge couple device (CCD) or contact image sensor (CIS) and said method further comprises the steps of:

providing a CCD signal amplifier for performing the step of receiving an analog CCD signal and in response thereto generating an amplified CCD signal;

providing a CIS signal amplifier for performing the step of receiving an analog CIS signal and in response thereto generating an amplified CIS signal; and providing a signal selector, coupled to and between said CCD and CIS signal amplifiers, for performing the step of receiving one of said plurality of sampling control signals, said analog reference signal, said amplified CCD signal and said amplified CIS signal and in accordance therewith outputting said analog reference signal and one of said amplified CCD and CIS signals as said analog pixel signal.

\* \* \* \* \*